United States Patent [19]

Simmons

[11] Patent Number: 5,393,324

[45] Date of Patent: Feb. 28, 1995

[54] AROMATIC POLYETHERKETONE GAS SEPARATION MEMBRANES

[75] Inventor: John W. Simmons, Wilmington, Del.

[73] Assignee: L'Air Liquide S.A., Paris, France

[21] Appl. No.: 147,597

[22] Filed: Nov. 5, 1993

[51] Int. Cl.$^6$ ............................................. B01D 53/22
[52] U.S. Cl. ........................................ 95/45; 95/54; 96/10; 96/14
[58] Field of Search .................... 95/45, 52; 96/10, 14; 210/500.41, 500.27

[56] References Cited

U.S. PATENT DOCUMENTS

| | | | |
|---|---|---|---|
| 4,874,401 | 10/1989 | Jeanes | 95/54 X |
| 4,957,817 | 9/1990 | Chau et al. | 428/436 |
| 4,964,890 | 10/1990 | Reuter et al. | 55/158 |
| 5,030,252 | 7/1991 | Sanders, Jr. et al. | 55/16 |
| 5,067,971 | 11/1991 | Bikson et al. | 96/10 X |
| 5,071,448 | 12/1991 | Bikson et al. | 95/54 X |
| 5,080,698 | 1/1992 | Krizan | 55/158 |
| 5,082,565 | 1/1992 | Haubs et al. | 95/45 X |
| 5,085,676 | 2/1992 | Ekiner et al. | 55/158 |
| 5,115,076 | 5/1992 | Reuter et al. | 528/125 |
| 5,248,319 | 9/1993 | Ekiner et al. | 95/54 |
| 5,266,100 | 11/1993 | Simmons | 95/54 X |

FOREIGN PATENT DOCUMENTS

61-259727  11/1986  Japan ........................ 96/14

*Primary Examiner*—Robert Spitzer

[57] ABSTRACT

Novel substituted aromatic polyetherketone gas separation membranes and the process of using such membranes to separate one or more gases from a gaseous mixture is disclosed. The polyetherketones are formed from aromatic alcohols of the formula

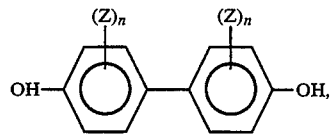

where Z is independently alkyl groups having 1 to 10 carbon atoms, most preferably a tertiary butyl group, n is an integer from 1 to 4, preferably 1.

7 Claims, No Drawings

AROMATIC POLYETHERKETONE GAS SEPARATION MEMBRANES

FIELD OF THE INVENTION

The present invention relates to aromatic polyetherketone gas separation membranes and the process for separating one or more gases from a gaseous mixture using such membranes. The polyetherketones are derived from alkyl substituted aromatic alcohols. The inventive gas separation membranes exhibit exceptionally good permeation rates with good selectivity.

PRIOR ART

Aromatic polyetherketones, particularly polyetherketones made from aromatic alcohols are well known in the art. Gas separation membranes made from certain polyetherketones are also known in the art. For example, U.S. Pat. No. 5,115,076 describes aromatic polyetherketones derived from aromatic ketones having a bivalent diphenolate residue. Such polymers may be fabricated into membranes which show a combination of high gas permeability, high flame resistance and high thermal and mechanical stability.

The polyetherketone membrane compositions of the prior art, although useful as gas separating membranes, not only suffer from the disadvantages of having to satisfy specific structural constraints, but are also difficult to fabricate into configurations such as hollow fiber membranes because these compositions tend to be soluble in relatively few solvents. Moreover, the membranes of the prior art tend to have relatively low flux. A need therefore exists for fluid separation membranes that avoid the fabrication and solubility problems of the prior art that also provide improved gas separation properties.

SUMMARY OF THE INVENTION

The present invention relates to certain substituted aromatic polyetherketone separation membranes which are particularly useful for separating gases and the process for using them. This class of membrane materials compositionally contain alcohols which incorporate substituted aromatic units, preferably alkyl substituted aromatic units, more preferably alkyl substituted biphenol, most preferably tertiary butyl substituted biphenol. Membranes formed from this class of polyetherketone materials exhibit superior gas permeability and good selectivity. It is believed that the high permeabilities of some gases from multicomponent mixtures is due to the molecular free volume in the polymer which is created by the alkyl substituents on the aromatic alcohols.

DETAILED DESCRIPTION OF THE INVENTION

The present invention relates to the discovery that gas separation membranes exhibiting exceptional gas permeability can be obtained by forming such gas separation membranes from polyetherketones, which incorporate substituted aromatic alcohol having the structural formula

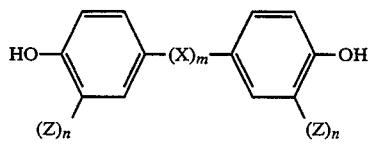

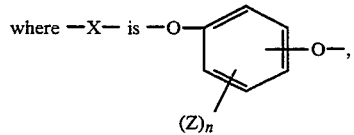

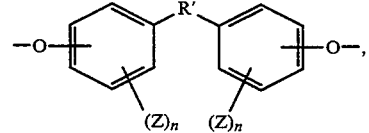

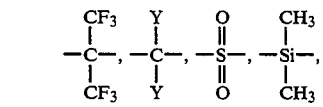

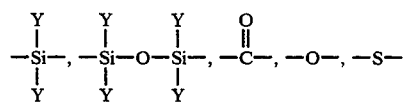

or mixtures thereof; where Z is independently alkyl groups having 1 to 10 carbon atoms or aromatic groups having 6 to 12 carbon atoms, preferably a tertiary butyl group; Y is independently alkyl groups having 1 to 10 carbon atoms; n is independently an integer from 1 to 4 inclusive, preferably 1; and m is 0 or 1, preferably 0. R' is a carbon-carbon single bond,

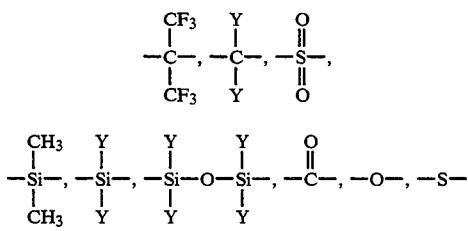

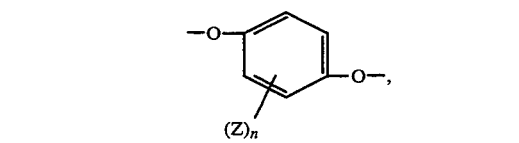

mixtures thereof.

The substituted aromatic alcohol of the present invention may be mixed with other aromatic alcohols. The substituted aromatic alcohol is by weight, preferably 10–100%, most preferably 50–100% of the total alcohol, and the other aromatic alcohol comprises preferably 0–90%, most preferably 0–50% of the total alcohol constituent.

Polyetherketone separation membranes prepared from such alcohols possess an excellent balance of gas permeation rates and selectivities of one gas over other gases in a multicomponent gas mixture. The high gas permeability of these membranes is believed to be due to optimization of the molecular free volume in the polymer structure resulting from the incorporation of said substituted aromatic alcohols in the polyetherketone chain. In particular, it is believed that the alkyl or aromatic substituents on the alcohol increase the molecular free volume of the polymer.

Generally, an inverse relationship between the gas permeation rate (flux) and the selectivity of the gas over other gases in a multicomponent gas mixture has been exhibited within polymer classes, such as polyetherketones, polyethersulfones, polyesters, polyimides, polyamides and polyamide-imides. Because of this, prior art polyetherketone gas separation membranes generally tend to exhibit either high gas permeation rates at the sacrifice of high gas selectivities or high gas selectivities at the sacrifice of high permeation rates. It would be highly desirable for gas separation membranes to exhibit high gas permeation rates while maintaining high gas selectivities.

The present invention circumvents the above shortcomings and provides exceptionally high permeation polyetherketone gas separation membranes while maintaining good selectivity.

Polyetherketone materials useful in the present invention are made from aromatic alcohols described above and aromatic dihalogenated-ketones, such as 4,4'-difluorobenzophenone. These dihalogenated-ketones are not intended to be limiting as a wide variety of dihalogenated-ketones may be used.

The polyetherketones have the following repeating structure:

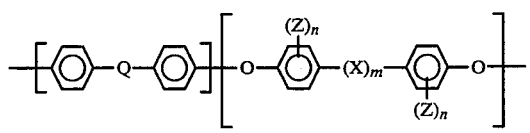

where X, Z, m and n are defined above.

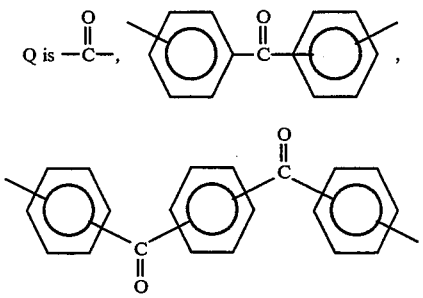

or mixtures thereof.

The polyetherketone may be depicted by the following repeating formula:

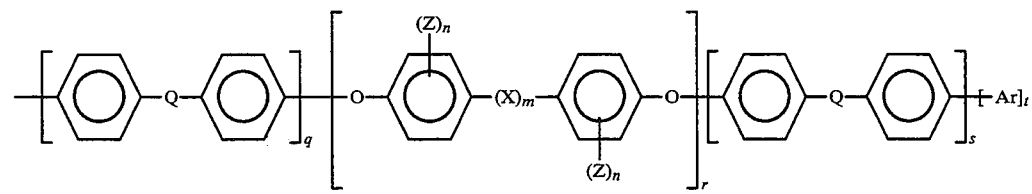

where X, Z, m, n and Q are defined above and Ar is any aromatic diol moiety. q, r, s and t are fractions from 0 to 1 where q+s=1 and r+t=1 with r>0 and preferably r is 0.5 to 1.0.

In general, the polyetherketones of this invention have a weight average molecular weight within the preferred range of from about 10,000 up to about 500,000 and more preferably from about 50,000 up to about 200,000.

In the preferred process for preparing the polyetherketone of this invention, approximately equimolar quantities of the substituted aromatic alcohol and the aromatic dihalogenated ketone are reacted by well-established procedures known in the art, such as condensation polymerization or solution polymerization. Melt polymerization may also be used.

The resulting polyetherketone may then, if desired, be blended using conventional solution blending technology to yield a blend having specifically tailored properties.

The preferred polyetherketone compositions of the present invention are soluble in a wide range of ordinary organic solvents including most amide solvents such as N-methyl pyrrolidone, and several chlorinated solvents such as dichloromethane and trichloroethane. This is a great advantage for the ease of fabrication of industrially useful gas separation membranes. To prepare membranes in accordance with this invention, the polymer solution is cast as a sheet onto a support, or spun through a cored spinneret to yield a hollow fiber. The solvent is then removed. For example, if a uniform membrane is desired, the solvent is evaporated by heating. On the other hand, if an asymmetric membrane is desired, the film or fiber structure is quenched in a liquid which is a nonsolvent for the polymer and a solvent for the organic solvent already present.

Gas separation membranes prepared from the polyetherketone materials of the present invention possess an excellent balance of gas permeation rates and selectivities for one gas over other gases in a multicomponent gas mixture. Generally, prior polyetherketone gas separation materials exhibit an inverse relationship between the gas permeation rate and the selectivity of said gas over other gases in a multicomponent gas mixture. The preferred materials of the present invention (Example 4) have been found to have a permeation rate for oxygen of 3.94 Barrer while maintaining a good oxygen/nitrogen selectivity of 4.74.

The polyetherketones described in this invention also have high inherent thermal stabilities. They are generally stable up to 400° C. in air or inert atmospheres. The glass transition temperatures of these polyetherketones are generally above 50° C. The high temperature characteristics of these compositions can help to prevent the membrane compaction problems observed in other polymers at even moderate temperatures.

The polyetherketone membranes disclosed herein have found use in gas separations. The present invention finds use in the enrichment of oxygen and nitrogen from air for increased combustion or inerting systems, respectively; in recovery of hydrogen in refinery and ammonia plants; separation of carbon monoxide from hydrogen in syngas systems; and separation of carbon dioxide or hydrogen sulfide from hydrocarbons.

The permeability of gasses through membranes is defined as the Barrer (B).

$$1 \text{ Barrer} = \frac{10^{-10} \text{ cm}^3 \text{ (STP)} \times \text{cm.}}{\text{cm}^2 \times \text{sec.} \times \text{cm. Hg.}}$$

wherein
cm$^3$/sec (STP) is the flux (flow rate) in units volume per seconds of permeated gas at standard temperature and pressure,
cm. is the thickness of the film,
cm$^2$ is the area of film, and
cm. Hg is the pressure (or driving force).

The selectivity of a membrane in separating a two component fluid mixture is defined as the ratio of the rate of passage of the more readily passed component to the rate of passage of the less readily passed component. Selectivity may be obtained directly by contacting a membrane with a known mixture of gasses and analyzing the permeate. Alternatively, a first approximation of the selectivity is obtained by calculating the ratio of the rams of passage of the two components determined separately on the same membrane. Rates of passage may be expressed in Barrer (B) units. As an example of selectivity, a $O_2/N_2 = 10$ indicates that the subject membrane allows oxygen gas to pass through at a rate 10 times that of nitrogen.

The invention will now be further illustrated by way of the following Examples, which are considered to be illustrative only, and non-limiting.

EXAMPLES

General Solution Polymerization Procedure

The polyetherketones of Examples 1–4 were prepared by the following procedure: A 3-necked round-bottomed flask equipped with a mechanical stirrer and a nitrogen inlet and a Dean-Stark trap was charged with the aromatic diols (Diol 1 and Diol 2 in the mole ratios indicated in Table 1) (1 equivalent), potassium carbonate (2.2 equivalents), the aromatic dihalogenated ketones (Dihal 1 and Dihal 2 in the mole ratios indicated in Table 1) (1 equivalent). The condensation occurs under anhydrous conditions in an aprotic solvent (NMP or DMAC) with the azeotropic removal of water at elevated temperatures (150°–200° C.). Toluene is used as the azeotroping solvent. The polymer was precipitated into water and ground up in a blender, washed with water and then methanol (2 times), and air-dried overnight. The polymer was further dried in a vacuum oven at 230° C. for 2 hours.

General Film Forming Procedure

A film of each of the above polyetherketone was cast from a 10 to 20% by weight N-methylpyrrolidone solution onto a glass plate at 120° C. with a 15-mil (38×10$^{-5}$ m) knife gap. The film was dried on the plate at 120° C. for 60–90 minutes and then removed from the plate. The film was air dried overnight. The film was then further dried in a vacuum oven (2.67 kPa) at 230° C. for 18 hours.

The above films (film thicknesses = 1–2.5 mils) were tested for oxygen permeability ($P_{O_2}$) and mixed gas oxygen/nitrogen (21/79 mole ratio) permeabilities ($P_{O_2}/P_{N_2}$) at 500 psig (34.5×10$^5$ Pa) at 25° C. The results are reported in Table 1.

TABLE 1

| Ex. | Diol 1 (a) | Diol 2 (b) | Mole % (a)/ Mole % (b) | Dihal 1 (c) | Dihal 2 (d) | Mole % (c)/ Mole % (d) | $P_{O_2}$ (Barrers) | $P_{O_2}/P_{N_2}$ |
|---|---|---|---|---|---|---|---|---|
| 1 | A | — | 100% | Z | — | 100 | 2.42 | 5.42 |
| 2 | B | — | 100% | Z | — | 100 | 2.90 | 5.78 |
| 3 | A | C | 75/25 | Y | — | 100 | 3.94 | 4.12 |
| 4 | A | D | 75/25 | Y | — | 100 | 3.94 | 4.74 |

Legend
A = 3,3'-Di-t-butyl-4,4'-dihydroxybiphenyl (DBBP)
B = 4,4'-dihydroxy-3,3',5,5'tetramethyl biphenyl
C = Resorcinol (Res)
D = 4,4'-[2,2,2-trifluoro (trifluoromethyl) ethylidene] bisphenol
Y = 4,4'-Difluorobenzophenone (DFBP)
Z = 1,3-Bis(4-fluorobenzoyl)benzene (1,3-FBB or M-FBB)

What is claimed is:
1. A gas separation membrane comprised from:
(a) at least one unit derived from the following formula:

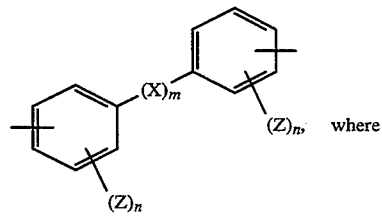 where

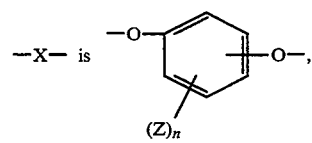

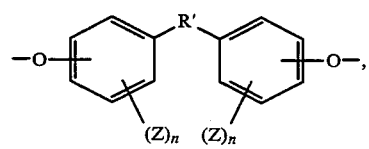

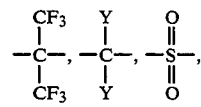

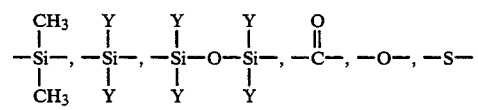

or mixtures thereof; where Z is independently, alkyl groups having 1 to 10 carbon atoms or aromatic groups having 6 to 12 carbon atoms; Y is independently alkyl groups having 2 to 10 carbon atoms; n is independently an integer from 1 to 4 inclusive; m is 0 or 1; and R' is a carbon-carbon single bond,

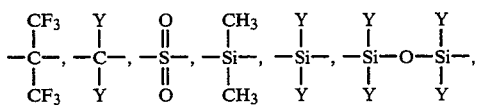

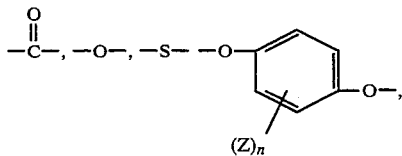

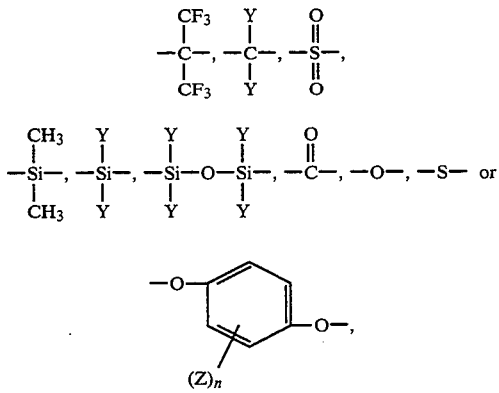

or mixtures thereof; and (b) at least one unit derived from an aromatic dihalogenated ketone moiety.

2. The membrane of claim 1 where Z is a tertiary butyl group, n=1 and m=0.

3. The membrane of claim 1 wherein the dihalogenated aromatic ketone is 4,4'-difluorobenzophenone.

4. The membrane of claim 1 wherein unit (a) is derived from 3,3'-di-t-butyl-4,4'-dihydroxy biphenyl; 4,4'-dihydroxy-3,3',5,5'-tetramethyl biphenyl; 4,4'-dihydroxy-2,2',3,3',5,5'-hexamethyl biphenyl, tetramethyl bisphenol F or mixtures thereof.

5. The membrane of claim 4 wherein unit (a) is derived from 3,3'-di-t-butyl-4,4'-dihydroxy biphenyl.

6. The membrane of claim 1 having the following repeating unit:

groups having 1 to 10 carbon atoms; n is independently an integer from 1 to 4 inclusive; and m is 0 or 1; R' is a carbon-carbon single bond,

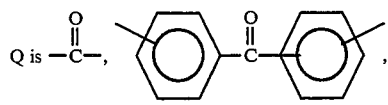

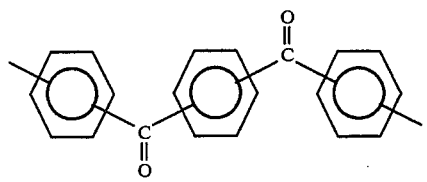

or mixtures thereof and Ar is any aromatic diol moiety; q, r, s and t are fractions from 0 to 1 where q+s=1 and r+t=1 with r>0; and

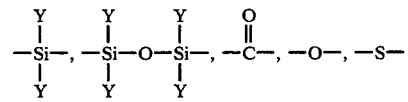

7. A process for separating one or more gases from a gaseous mixture comprising bringing said gaseous mixture into contact with the first side of the gas separation membrane of claim 1 in a manner to cause a portion of the mixture to pass through the membrane to a permeate side, the resulting gas mixture on the permeate side being enriched in one or more component over that of the mixture on the first side.

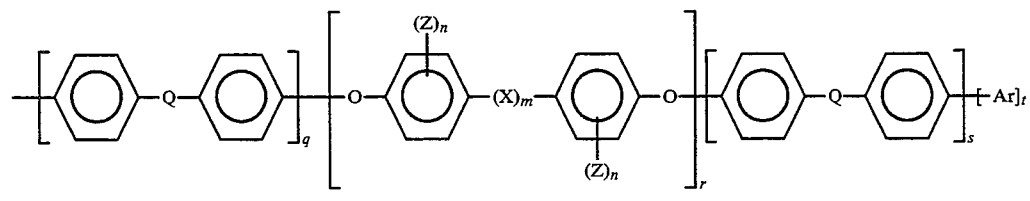

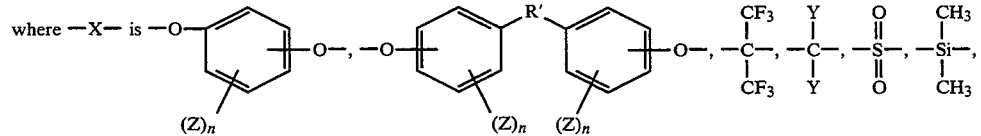

or mixtures thereof; where Z is independently alkyl groups having 1 to 10 carbon atoms or aromatic groups having 6 to 12 carbon atoms; Y is independently alkyl

* * * * *